US010671163B2

(12) United States Patent
Kiemele et al.

(10) Patent No.: US 10,671,163 B2
(45) Date of Patent: Jun. 2, 2020

(54) REFINING VIRTUAL MESH MODELS THROUGH PHYSICAL CONTACTS

(71) Applicant: Microsoft Technology Licensing, LLC, Redmond, WA (US)

(72) Inventors: Kenneth Liam Kiemele, Redmond, WA (US); Christian Michael Sadak, Seattle, WA (US); Adolfo Hernandez Santisteban, Bothell, WA (US); Scott Christopher Speirs, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/044,258

(22) Filed: Jul. 24, 2018

(65) Prior Publication Data

US 2020/0033944 A1 Jan. 30, 2020

(51) Int. Cl.
*G06F 3/01* (2006.01)
*G06F 3/0346* (2013.01)
(Continued)

(52) U.S. Cl.
CPC ............ *G06F 3/014* (2013.01); *G06F 3/0346* (2013.01); *G06T 19/006* (2013.01); *G06T 19/20* (2013.01)

(58) Field of Classification Search
CPC ....... G06T 17/00; G06T 19/006; G06T 19/20; G06Q 30/06; G06F 3/014; G06F 16/29;
(Continued)

(56) References Cited

U.S. PATENT DOCUMENTS 8,179,604 B1 * 5/2012 Prada Gomez .... G02B 27/0093
345/8
9,645,397 B2 5/2017 da Veiga et al.
(Continued)

FOREIGN PATENT DOCUMENTS

| WO | 2017151142 A1 | 9/2017 |
| WO | 2018027206 A1 | 2/2018 |
| WO | 2018100575 A1 | 6/2018 |

OTHER PUBLICATIONS

Leibe, et al., "The Perceptive Workbench: Towards Spontaneous and Natural Interaction in Semi-Immersive Virtual Environments", In Proceedings of the IEEE Virtual reality, Mar. 22, 2000, 9 Pages.
(Continued)

*Primary Examiner* — Richard J Hong
(74) *Attorney, Agent, or Firm* — Alleman Hall Creasman & Tuttle LLP (57) ABSTRACT

Examples are disclosed that relate to refining virtual mesh models through physical contacts. For example, a hand-mounted mobile device, such as a wearable glove, may be used to create and/or emphasize specific points within a virtual mesh model of a physical environment. An indication of physical contact of an interface of the mobile device with a physical object may be obtained via a touch sensor of the mobile device. A location and/or an orientation of the interface of the mobile device during the physical contact with the physical object may be identified based on sensor data obtained from one or more positioning sensors. Location data indicating the location may be stored in a data storage device from which the location data may be referenced. In an example, refinement of a virtual mesh model of a physical environment containing the physical object may be prioritized based on the location data.

20 Claims, 5 Drawing Sheets

(51) Int. Cl.
*G06T 19/00* (2011.01)
*G06T 19/20* (2011.01)

(58) Field of Classification Search
CPC ...... G06F 3/011; G06F 17/5004; G06F 17/50; G06F 3/0346; A41D 19/0024; G02B 27/0093; G02B 27/017; G02B 27/0172
See application file for complete search history.

(56) References Cited

U.S. PATENT DOCUMENTS

| | | | |
|---|---|---|---|
| 9,865,089 B2 | 1/2018 | Burns et al. | |
| 2002/0024675 A1* | 2/2002 | Foxlin | G02B 27/017 356/620 |
| 2003/0144768 A1 | 7/2003 | Hennion et al. | |
| 2010/0156930 A1* | 6/2010 | Ghyme | G06Q 30/06 345/619 |
| 2012/0249741 A1* | 10/2012 | Maciocci | G06F 3/011 348/46 |
| 2014/0049559 A1 | 2/2014 | Fleck et al. | |
| 2014/0088928 A1* | 3/2014 | Chen | G06T 17/00 703/1 |
| 2014/0375769 A1* | 12/2014 | Algreatly | G06F 17/50 348/46 |
| 2016/0055268 A1* | 2/2016 | Bell | G06F 17/5004 703/1 |
| 2016/0191887 A1 | 6/2016 | Casas | |
| 2016/0379405 A1* | 12/2016 | Baca | G06F 16/29 463/32 |
| 2017/0115488 A1* | 4/2017 | Ambrus | G02B 27/0172 |
| 2017/0357332 A1 | 12/2017 | Balan et al. | |
| 2018/0098583 A1* | 4/2018 | Keller | A41D 19/0024 |
| 2018/0364804 A1* | 12/2018 | Hoen | G06F 3/014 |

OTHER PUBLICATIONS

Martinez, Eduardo Munoz, "Real-time Surface Reconstruction and Interaction for Mixed Reality", In Dissertation of University of Dublin, Sep. 2017, 70 Pages.

"International Search Report and Written Opinion Issued in PCT Application No. PCT/US19/038073", dated Sep. 18, 2019, 12 Pages.

* cited by examiner

REFINING VIRTUAL MESH MODELS THROUGH PHYSICAL CONTACTS

BACKGROUND

Virtual models may be used to describe features of a physical environment, including the physical objects contained therein. Augmented reality, virtual reality, and various forms of mixed reality may each rely on virtual models for the spatial arrangement of virtual content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to refining virtual mesh models through physical contacts. For example, a hand-mounted mobile device, such as a wearable glove, may be used to create and/or emphasize specific points within a virtual mesh model of a physical environment. An indication of physical contact of an interface of the mobile device with a physical object may be obtained via a touch sensor of the mobile device. A location and/or an orientation of the interface of the mobile device during the physical contact with the physical object may be identified based on sensor data obtained from one or more positioning sensors. Location data indicating the location may be stored in a data storage device from which the location data may be referenced. In an example, refinement of a virtual mesh model of a physical environment containing the physical object may be prioritized based on the location indicated by the location data.

DETAILED DESCRIPTION

The refinement of virtual mesh models and the reconstruction of surfaces representing physical environments have the potential to consume significant time and computing resources. For example, a computing system operating without sufficient human intervention may image, refine, and reconstruct irrelevant or less important features within a physical environment at the cost of delaying or neglecting the imaging, refinement, and reconstruction of more relevant or important features. Additionally, virtual mesh models developed by computing systems with respect to darkly colored and/or highly featured surfaces may be less accurate or of inadequate resolution without human intervention as compared to brightly colored and/or planar surfaces.

The disclosed examples may address these and other issues through the use of a mobile device that enables a user to define a location within a physical environment through physical contact with a physical object for which refinement of a virtual mesh model is to be prioritized. The physical contact provided by the mobile device may be additionally used to obtain a more accurate measurement of physical objects as compared to optical imaging techniques, including the ability to infer a hardness of the physical objects. By increasing the accuracy of the virtual mesh model, augmented reality, virtual reality, and/or mixed reality experiences that rely on the virtual mesh model may be more closely tied to the physical environment.

Figure 1:
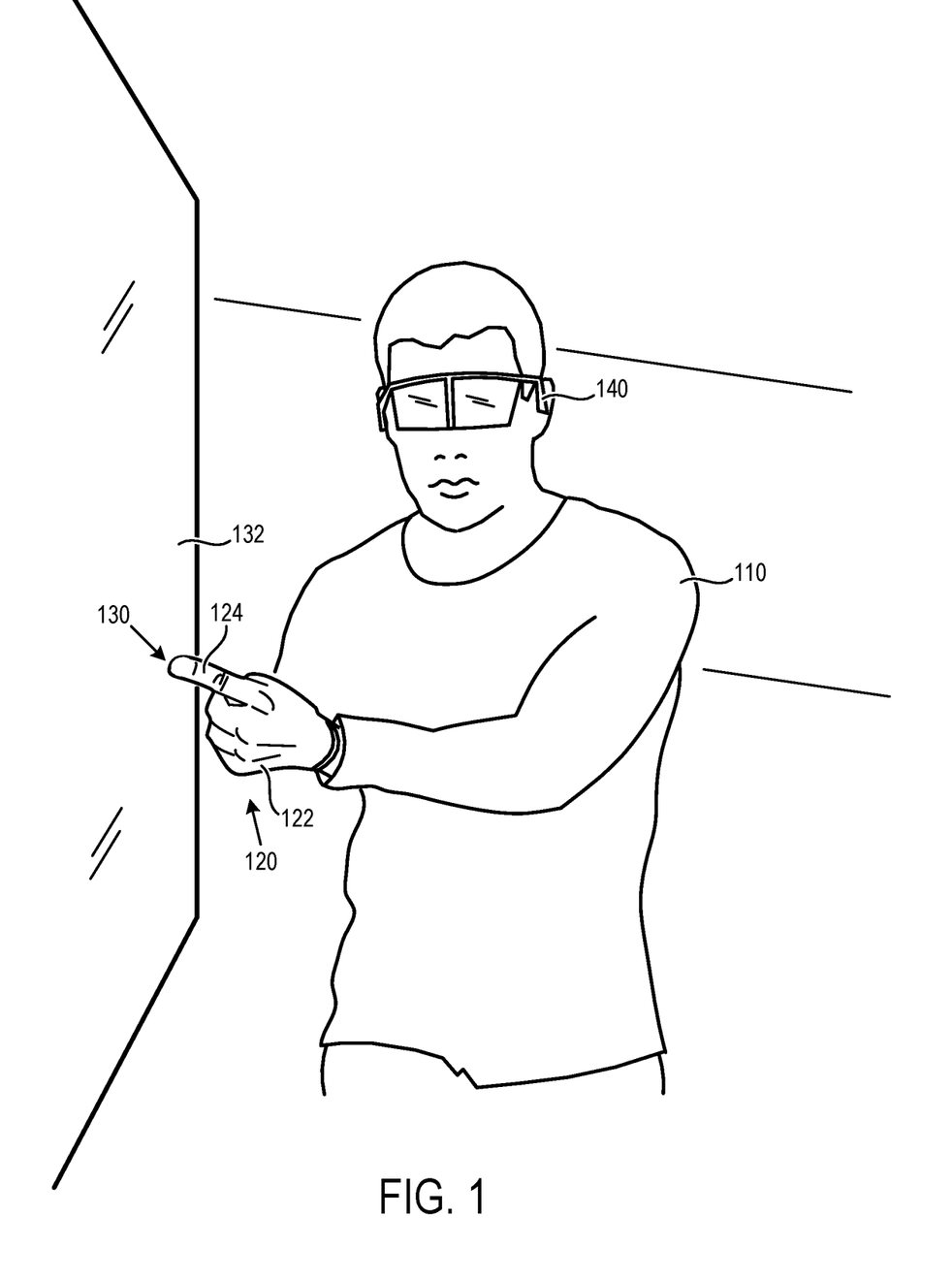
FIG. 1 depicts an example of a human subject using a mobile device to define a location within a physical environment where refinement of a virtual mesh model is to be prioritized.

FIG. 1 depicts an example of a human subject 110 (i.e., a user) using a mobile device 120 to define a location 130 within a physical environment where refinement of a virtual mesh model may be prioritized. In this example, mobile device 120 is a hand-mounted or hand-based mobile device comprising a wearable glove 122 having a plurality of finger compartments. An example finger compartment 124 corresponding to an index finger of the user is depicted in FIG. 1 physically contacting a physical object 132 (e.g., a wall) within the physical environment corresponding to location 130. Also within FIG. 1, the user is wearing a head-mounted display (HMD) device 140 by which virtual content may be displayed in relation to a virtual mesh model that represents features of the physical environment, including physical object 132. Touch data from one or more touch sensors of mobile device 120, combined with location data obtained from one or more positioning sensors, may be used to detect location 130 at which mobile device touches physical object 132 for further refining the virtual mesh model used by HMD device 140, for example, by creating a new mesh node corresponding to location 130 and/or by identifying a region where refinement of the mesh is to be prioritized.

Figure 2:
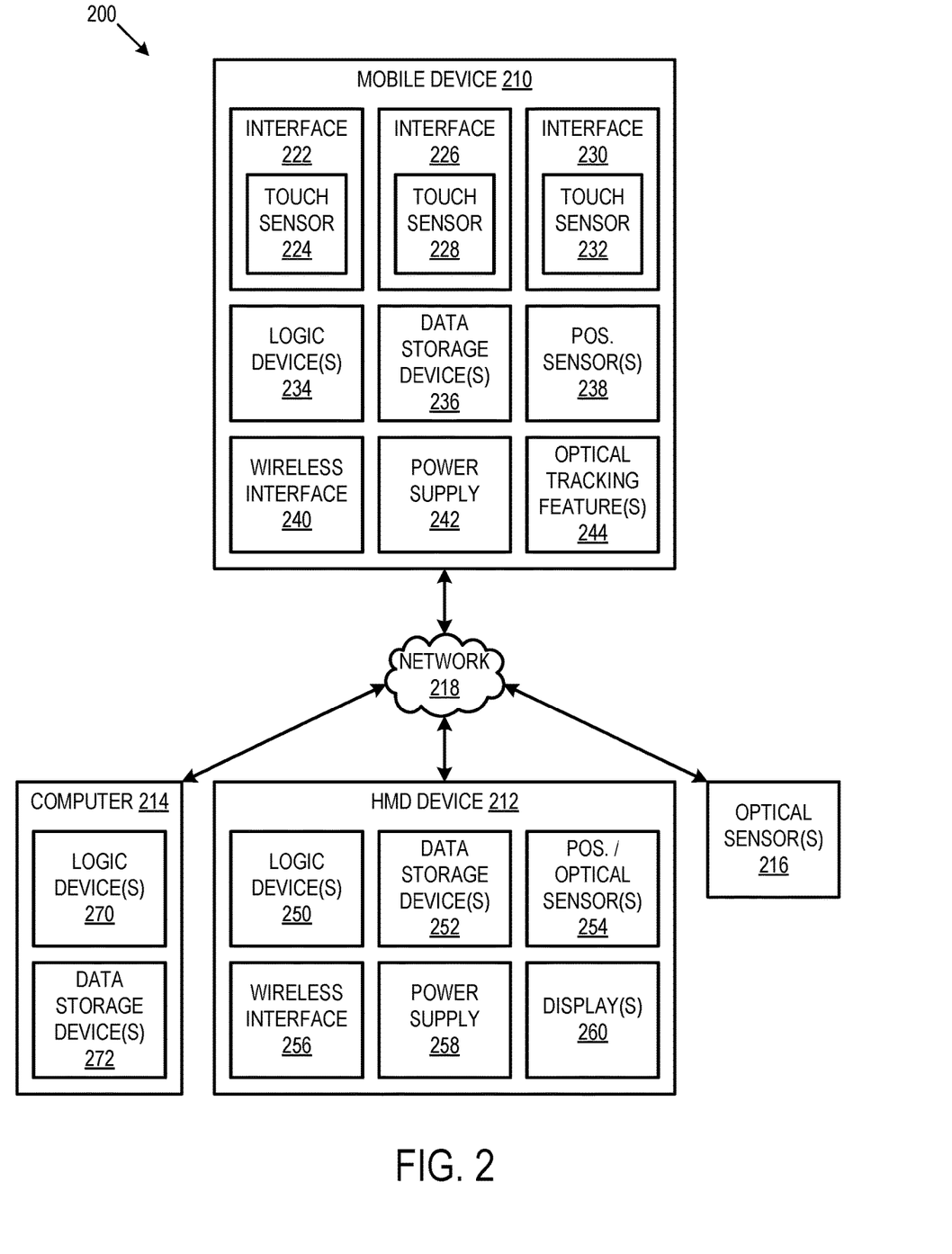
FIG. 2 is a schematic diagram depicting an example computing system.

FIG. 2 is a schematic diagram depicting an example computing system 200. Computing system 200 includes a mobile device 210, an HMD device 212, an external computing device 214 that is external mobile device 214 and HMD device 212, and one or more external optical sensors 216 that are to external mobile device 214 and HMD device 212, each of which may communicate with each other via a communications network 218. Communications network 218 may support wired and/or wireless communications between or among mobile device 210, HMD device 212, computing device 214, optical sensors 216, and/or other devices via wide area, local area, and/or personal area network components.

Mobile device 210 may be a hand-mounted or hand-based mobile device, such as a wearable glove. Mobile device 120 of FIG. 1 is an example of mobile device 210 of FIG. 2, but mobile device 210 also may take other suitable forms. Mobile device 210 may include one or more interfaces each having one or more associated touch sensors. For example, mobile device 210 may include a first interface 222 and a first touch sensor 224. An interface of a mobile device, such as first interface 222 may refer to an external surface of the mobile device by which physical contact (i.e., a touch event) of the mobile device with a physical object may be detected. Such an interface may take various forms depending on a form factor of the mobile device. Within the context of mobile device 210 comprising a glove having a finger compartment, first interface 222 and first touch sensor 224 may be disposed adjacent to an end of the finger compartment of the glove. As an example, first interface 222 may be positioned along an exterior of a first finger compartment on a palm side of the glove corresponding to a distal segment of an index finger. However, other suitable locations may be used. First touch sensor 224 may be located beneath a surface of first interface 222 or may be integrated with first interface 222 to detect the first interface physically contacting a physical object.

Mobile device 210 may include additional interfaces and associated touch sensors, such as second interface 226 and second touch sensor 228; third interface 230 and third touch sensor 232, etc. Continuing with the glove example, second interface 226 may be positioned along an exterior of a second finger compartment on the palm side of the glove corresponding to a distal segment of a middle finger, and the third interface 230 may be positioned along an exterior of a third finger compartment on the palm side of the glove corresponding to a distal segment of a thumb. Second and third touch sensors 228, 232 may be similarly located beneath a surface of second and third interfaces 226, 230 respectively, or may be integrated with second and third interfaces 226, 230 respectively to likewise detect these interfaces physically contacting a physical object. As an example, touch sensors 224, 228, and 232 may each include a piezoresistive sensor and/or a capacitive touch sensor. Mobile device 210 may include one or more additional interfaces and/or touch sensors not depicted in FIG. 2. For example, additional interfaces and touch sensors may be associated with fourth and fifth finger compartments of a glove, as well as various palm locations of a glove form factor. It will be understood that the terms "finger" or "finger compartment" may be used herein to refer to a thumb or thumb compartment of a glove in addition to index, pointer, ring, and pinky fingers.

Mobile device 210 may take the form of a computing device. For example, mobile device 210 may include one or more logic devices 234 and one or more data storage devices 236. Mobile device 210 also may include one or more positioning sensors 238 by which a positioning of the mobile device may be identified, including a location and/or an orientation of the mobile device and/or a portion thereof (e.g., the location and/or orientation of an individual finger compartment). Mobile device 210 additionally may include a wireless interface 240 that enables the mobile device to receive and/or transmit wireless communications with respect to other devices, such as HMD device 212, computing device 214, cameras 216, etc. via a wireless component of communications network 218. Alternatively or additionally, wired communications may be supported by mobile device 210 Mobile device 210 may include a power supply 242 for powering electronic components of the mobile device. Mobile device 210 may include one or more optical tracking features 244 (e.g., an optically trackable tag or constellation) that facilitate the tracking of the positioning of the mobile device through imaging of the mobile device via an optical sensor.

HMD device 212 may take the form of a computing device. Previously described HMD device 140 of FIG. 1 is an example of HMD device 212 of FIG. 2. HMD device 212 may include one or more logic devices 250, and one or more data storage devices 252. HMD device 212 may include one or more positioning sensors 254 by which a positioning of the HMD device and/or a positioning of mobile device 210 may be identified, including a location and/or an orientation of these devices or portions thereof. As an example, positioning sensors 254 may include an optical sensor (e.g., an outward facing camera) that may be used to image and track a positioning of mobile device 210. HMD device 212 may include a wireless interface 256 that enables the HMD device to receive and/or transmit wireless communications with respect to other devices, such as mobile device 210, computing device 214, optical sensors 216, etc. via a wireless component of communications network 218. Alternatively or additionally, wired communications may be supported by HMD device 212. HMD device 212 may include a power supply 258 for powering electronic components of the HMD device. HMD device 212 may include one or more displays 260, which may include near-eye see-through displays within the context of mixed or augmented reality, or near-eye fully occluding displays within the context of virtual reality, as examples. In still other examples, HMD device 212 may instead take the form of a handheld computing device having a display and a camera, such as a smartphone, tablet computer, laptop computer, etc.

In an example, computing device 214 may be remotely located from one or more of mobile device 210, HMD device 212, and optical sensors 216. For example, computing device 214 may take the form of a remote server of a server system that is accessible over a wide area network component of communications network 218. In another example, computing device 214 may be co-located with one or more of mobile device 210, HMD device 212, and optical sensors 216. For example, computing device 214 may take the form of a gaming console, personal computer, or on-premises networking device that is accessible over a local area network or personal area network component of communications network 218. Computing device 214 includes one or more logic devices 270, and one or more data storage devices 272.

Optical sensors 216 may refer to fixed and/or mobile optical sensors, and may include dedicated cameras or cameras integrated into other electronic devices, for example. Optical sensors 216 may be used to image a physical environment and track a positioning of mobile device 210 and/or HMD device 212, for example.

Figure 3:
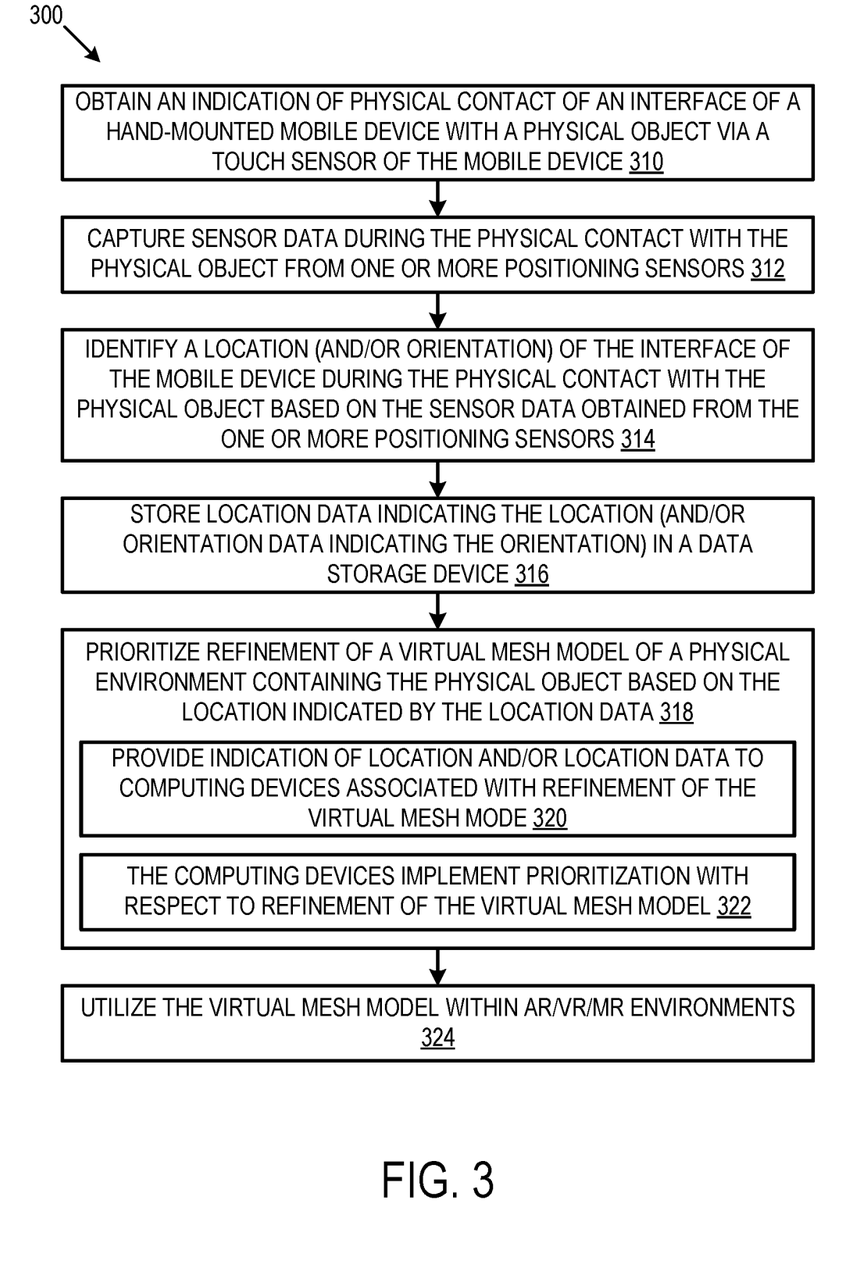
FIG. 3 is a flow diagram depicting an example method.

FIG. 3 is a flow diagram depicting an example method 300 for prioritizing refinement of a mesh representation of a physical environment through physical contact of a mobile device with an object. Method 300 may be performed by one or more devices of a computing system, such as previously described computing system 200 of FIG. 2 or a component thereof. For example, method 300 may be performed by mobile device 210 individually, by HMD device 212 individually, by computing device 214 individually, or by a combination of two or more of mobile device 210, HMD device 212, and/or computing device 214. Additional aspects of an example computing system that may perform method 300 are described in further detail with reference to FIG. 5.

At 310, the method includes obtaining an indication of physical contact of an interface of a hand-mounted mobile device with a physical object via a touch sensor of the mobile device. In an example, the mobile device comprises a glove that is wearable by a human subject, such as previously described with reference to mobile device 210 of FIG. 2. For example, the interface and the touch sensor may be disposed adjacent to an end of a finger compartment of the glove. The glove may include a plurality of finger compartments in which each finger compartment of the plurality of finger compartments includes a respective interface and a respective touch sensor disposed adjacent to an end of that finger compartment. However, other suitable configurations may be used.

The mobile device may capture and store in a data storage device one or more of a timestamp identifying when the physical contact occurred, an identifier of the interface involved in the physical contact, and/or sensor data captured by one or more positioning sensors of the mobile device at least during the physical contact. In examples where processing is performed offboard the mobile device, the mobile device may transmit the indication of physical contact of the interface to another device via a wired or wireless communications link. For example, the mobile device may transmit, directed to a target device, an indication of physical contact as one or more of a timestamp identifying when the physical contact occurred, an identifier of the interface of the mobile device that was involved in the physical contact, and/or sensor data captured by one or more positioning sensors of the mobile device at least during the physical contact. The target device may receive the indication of the physical contact of the interface via a wired or wireless communication link to be used for further processing remotely from the mobile device.

Furthermore, in examples in which the touch sensors of the mobile device can measure an amount of pressure or force associated with the physical contact of the interface with the physical object, these measurements may be stored, transmitted, and/or processed along with the above described timestamp and/or interface identifier. This measurement of an amount of pressure or force may be used to infer a hardness of the physical object, which may be used within augmented reality, virtual reality, and/or mixed reality environments to more accurately represent virtual objects interacting with the physical object. As an example, a hardness of a physical object may be correlated with a time-based and/or positioning-based force/pressure function in which measured values of force/pressure obtained by the touch sensor over a period time and/or over a distance represent a deformation of the physical object.

At 312, the method includes, upon obtaining the indication of the physical contact with the physical object, capturing sensor data from one or more positioning sensors indicating a positioning of the interface. The positioning of the interface may include a location in one, two, or three-degrees of freedom and/or an orientation of the interface in one, two, or three-degrees of freedom with respect to a reference frame. The reference frame may correspond to a device that tracks a positioning (e.g., location and/or orientation) of the mobile device or a portion of the mobile device (e.g., an individual finger compartment of a glove). The reference frame may be a local reference frame of the element that tracks the positioning or a different reference frame (e.g., global reference frame) of another element, device, or service. Coordinate transform may be used to translate a location and/or orientation within a first reference frame to a second reference frame. As an example, sensor data captured by positioning sensors of a mobile device within a local reference frame of the mobile device may be transformed to a reference frame used by an HMD device. As another example, sensor data captured by positioning sensors of a finger compartment of a glove within a local reference frame of the finger compartment may be transformed to another local reference frame, e.g. to a reference frame of a palm of the glove.

The sensor data may be captured from one or more positioning sensors located on-board the mobile device and/or from one or more positioning sensors located off-board the mobile device. In examples in which processing of the sensor data is performed offboard the mobile device, the method may further include transmitting the sensor data or an indication of the positioning of the interface over a wired or wireless communications link via a wired or wireless communication interface of the mobile device directed to a target device, such as a remote computing device. As examples, the one or more positioning sensors may include one or more inertial sensors, one or more magnetometer sensors, one or more global positioning sensors (e.g., GPS sensor or other wireless geo-location sensor), and/or one or more strain sensors located on-board the mobile device, as well as one or more optical sensors located off-board the mobile device that are used to image the mobile device. As an example, an optical sensor located off-board the mobile device may be used to image an optical tracking feature (e.g., a visual marker or tag, a constellation of visual markers, or other visual reference) of the mobile device. Inertial sensors and/or strain sensors located on-board the mobile device may be used to detect relative positioning and/or motion of two or more features of the mobile device that are moveable in relation to each other. For example, inertial sensors and/or strain sensors may be associated with individual finger compartments of a glove to enable a positioning of each finger compartment to be identified in relation to each other and/or to a hand/palm portion of the glove.

At 314, the method includes identifying a location of the interface of the mobile device during the physical contact with the physical object based on the sensor data obtained from one or more positioning sensors. The location of the interface may be identified by the mobile device or by another device, depending on implementation. The location of the interface may be identified by sensor fusion techniques in some examples, and may include sensor data obtained from a plurality of sensor types located on-board and off-board the mobile device.

At 316, the method includes storing location data indicating the location of the interface identified at 314 in a data storage device. The data storage device may reside on-board the mobile device or off-board the mobile device at another device or service. In an example, storing the location data in the data storage device may include storing the location data as a data component of a selected mesh node of a virtual mesh model. The location data may be stored by associating an identifier with the virtual mesh model to designate the selected mesh node as being the location of the physical contact within the virtual mesh model and/or to distinguish the selected mesh node from other mesh nodes, such as those identified by other techniques, including optical imaging, for example. In examples where the mobile device identifies the location of the interface, the mobile device may transmit the location data or an indication of the location of the interface directed to a target device via a wired or wireless communications link.

In at least some implementations, the method additionally or alternatively includes, at 314, identifying an orientation of the interface of the mobile device during the physical contact with the physical object based on the sensor data obtained from the one or more positioning sensors. In this implementation, the method may additionally or alternatively include, at 316, storing orientation data indicating the orientation in the data storage device similarly to the location data for the selected mesh node. Furthermore, measurements of pressure/force and/or inferred hardness of the physical object may be stored with the location and/or orientation data for the selected mesh node. Identifying an orientation of the interface during a physical contact with a physical object may be used to facilitate surface reconstruction of the physical object with respect to the virtual mesh model, for example. Orientation data and/or an indication of orientation of the interface may be transmitted by the mobile device to a target device over a wired or wireless communications link as previously described with reference to the indication of the position of the interface and/or the position data.

At 318, the method includes prioritizing refinement of the virtual mesh model of a physical environment containing the physical object based on the location indicated by the location data. In one example, prioritizing refinement of the virtual mesh model based on the location may include processing image data obtained by optical imaging of the physical environment to extract a higher resolution of mesh nodes in a vicinity of the location indicated by the location data as compared to other regions of the physical environment located outside of the vicinity of the location. In another example, prioritizing refinement of the virtual mesh model based on the location may include processing image data obtained by optical imaging of the physical environment to extract mesh nodes in a vicinity of the location indicated by the location data prior to processing other image data obtained by the optical imaging of the physical environment to extract mesh nodes located outside of the vicinity of the location. In yet another example, prioritizing refinement of the virtual mesh model based on the location includes capturing image data in a vicinity of the location indicated by the location data prior to capturing image data of other regions of the physical environment located outside of the vicinity of the location. In each of the above examples, the vicinity of the location may be defined by a predetermined size and/or shape surrounding the location, or may be defined at the time of acquisition. For example, a plurality of locations identified by multiple physical contacts of the mobile device with the physical environment may be used to define a path or area with respect to which refinement of the virtual mesh may be prioritized, thereby enabling a user to identify more complex areas for refinement. The above examples for prioritizing refinement of a virtual mesh may be used alone or in combination to improve the efficiency of virtual mesh generation and/or surface reconstruction of physical environments with respect to one or more locations identified by a user through physical contact with physical objects within the physical environment. The optical imaging in each of the above examples may be performed by one or more HMD devices or other electronic devices having a camera, for example.

As sub-processes to the prioritization of virtual mesh model refinement, at 320, an indication of the location of the physical contact and/or the location data thereof may be provided to one or more computing devices associated with the refinement of the virtual mesh model. As an example, a service running on a server system or other computing device disclosed herein may receive neighborhood requests for virtual mesh model data from HMD devices or other computing devices based on their respective locations, and may serve the location data for the physical contact to those requesting devices based on the neighborhood requests. At 322, the computing devices, upon receiving the location data, may implement the prioritization with respect to refinement of the virtual mesh model and/or surface reconstruction based on the location indicated by the location data.

At 324, the method may further include utilizing the virtual mesh model and/or reconstructed surfaces based on the virtual mesh model within augmented reality, virtual reality, and/or mixed reality environments. As an example, a hologram or other virtual content may be display at a defined positioning relative to the virtual mesh model and/or its reconstructed surfaces by a computing device, such as an HMD device. Method 300 of FIG. 3 may be repeated by a user to define additional locations where a virtual mesh may be refined and for which surface orientation and hardness measurements may be obtained to further enhance surface reconstruction of the physical environment.

Figure 4:
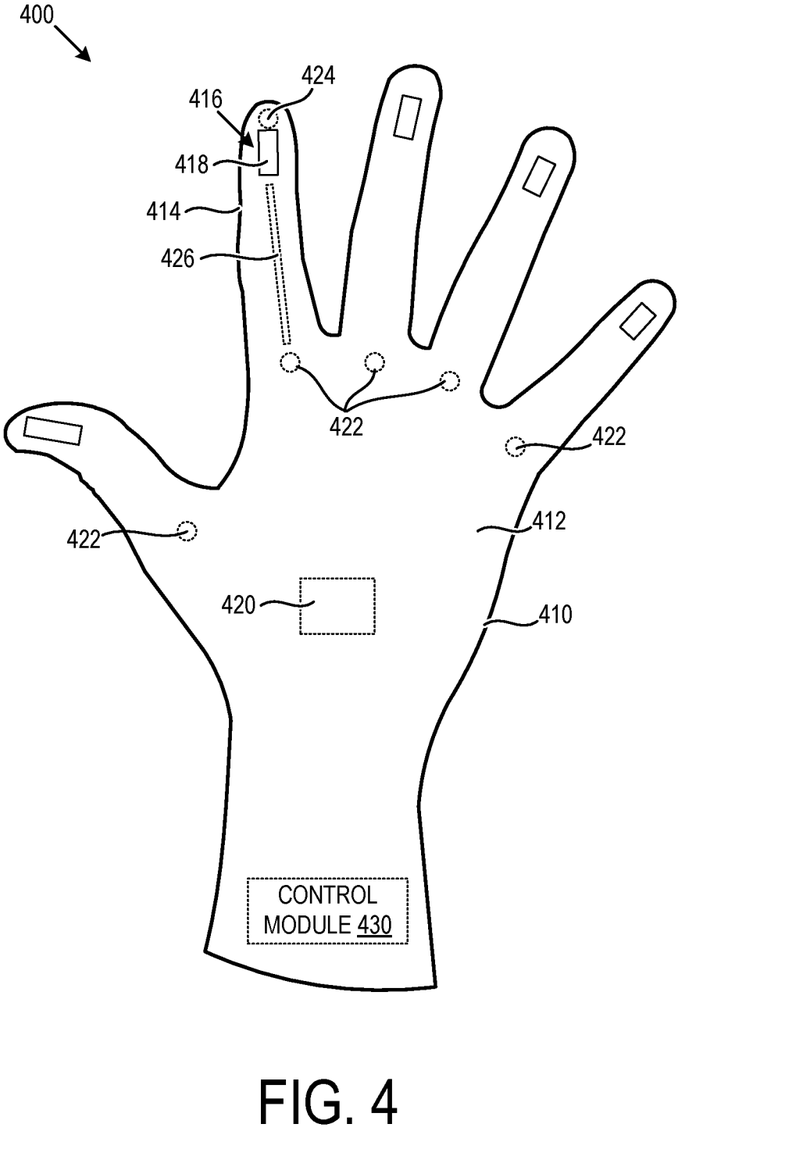
FIG. 4 is a schematic diagram depicting an example mobile device comprising a glove.

FIG. 4 is a schematic diagram depicting an example mobile device 400 comprising a glove 410. Mobile device 400 of FIG. 4 is an example of previously described mobile device 210 of FIG. 2, and glove 410 is an example of previously described glove 122 of FIG. 1. Glove 410 may include a body portion 412 that is formed from any suitable material or combination of materials, including natural textile materials, synthetic textile materials, blended textile materials, flexible polymer materials (e.g., a rubber, silicone, polyethylene, etc.), etc. Textile materials may be woven, knitted, composited, etc. from a collection of elements, such as thread or fiber, for example. Glove 410, in this example, is configured to flex and move with a similar feel as a conventional, non-electronically functional glove, to provide a user input mechanism that feels natural and unobtrusive. While shown as a five-finger glove for providing input via movement of all five fingers, in other examples a glove input device may include sensing capabilities for fewer than five fingers (e.g., thumb, index finger and middle finger in an example).

FIG. 4 depicts a palm side of the glove 410, with features located on an opposing side of the glove represented with broken lines. An example finger compartment 414 of glove 410 includes an interface 416 having an associated touch sensor 418. Touch sensor 418 may include a piezoresistive sensor and/or capacitive sensor, as an example. Touch sensor 418 may provide an indication of a physical contact of interface 416 with a physical object, and may additionally provide an indication of an amount of pressure or force applied by a hand of the user to the physical object through the interface. A 9-axis sensor system 420 is located on the back of the hand of glove 410, and may include a 3-axis gyroscopic sensor, a 3-axis accelerometer sensor, and a 3-axis magnetometer sensor, as an example. A set of optical tracking features 422 are located on the rear side of glove 410, which form a constellation that may be captured by a camera to identify a location and/or orientation of the glove or portion thereof. Where the optical tracking features 422 have a fixed spatial relationship, a rigid body rotation algorithm may be used to fit an observed pattern of constellation features in an image to a model of the constellation to determine a position of the glove. Where the optical tracking features 422 have a variable spatial relationship to one another, computer-training and/or machine learning may be used to train a classifier that determines a positioning of the optical tracking features across a domain of possible spatial relationships (e.g., finger positions within the context of a glove). In an example, optical tracking features 422 include light emitting diodes that emit infrared and/or visible light that may be interpreted by a previously trained computer program.

Glove 410 may include additional sensors associated with individual finger compartments, such as one or more additional inertial and/or magnetometer sensors 424, and one or more piezoresistive and/or strain sensors 426 to sense bending associated with respect to finger compartment 414, as additional examples of positioning sensors. Sensors 424 and/or 426 may provide an indication of a positioning of a user's finger in relation to the palm the hand, including a location and/or orientation of interface 416. An electronic control module 430 may be located on-board glove 410, which may include other electronic components such as those previously described with reference to mobile device 210 of FIG. 2. Within FIG. 4, electrical pathways between electronic control module 430 and the various sensor and/or electronic components of glove 410 have been omitted for sake of clarity.

In an example, the methods and processes described herein may be tied to a computing system of one or more computing devices. In particular, such methods and processes may be implemented as a computer-application program or service, an application-programming interface (API), a library, and/or other computer-program product.

Figure 5:
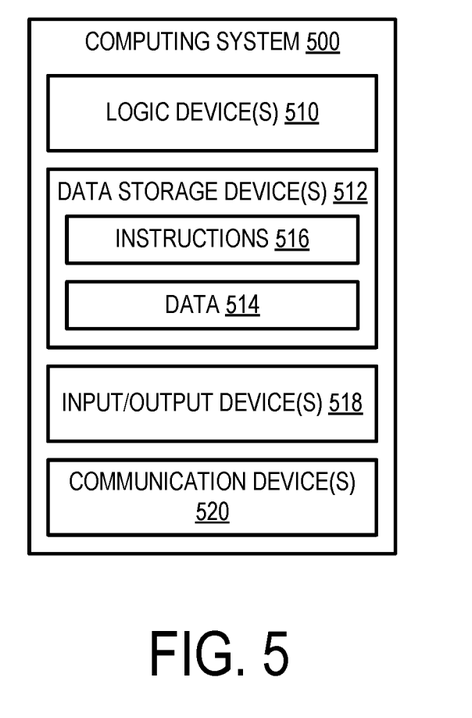
FIG. 5 is a schematic diagram depicting an example computing system in simplified form.

FIG. 5 is a schematic diagram depicting computing system 500 in simplified that can enact one or more of the methods and processes described above. Computing system 500 may take the form of one or more personal computers, server computers, tablet computers, home-entertainment computers, networking devices, gaming devices, mobile devices, HMD devices, and/or other computing devices.

Computing system 500 includes one or more logic devices 510, and one or more data storage devices 512. Computing system 500 may optionally include one or more input and/or output devices 518, one or more communication devices 520, and/or other components not shown in FIG. 5.

Logic devices 510 include one or more physical devices configured to execute instructions. For example, the logic devices may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

A logic device may include one or more processors configured to execute software instructions. Additionally or alternatively, a logic device may include one or more hardware or firmware logic machines configured to execute hardware or firmware instructions. Processors of a logic device may be single-core or multi-core, and the instructions executed thereon may be configured for sequential, parallel, and/or distributed processing. Individual components of a logic device optionally may be distributed among two or more separate devices, which may be remotely located and/or configured for coordinated processing. Aspects of a logic device may be virtualized and executed by remotely accessible, networked computing devices configured in a cloud-computing configuration.

Data storage devices 512 include one or more physical devices configured to hold data 514 and/or instructions 516 executable by the one or more logic devices 510 to implement the methods and processes described herein. When such methods and processes are implemented, the state of storage devices 512 may be transformed—e.g., to hold different data.

A data storage device may include removable and/or built-in devices. A data storage device may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. A data storage device may include volatile, nonvolatile, dynamic, static, read/write, read-only, random-access, sequential-access, location-addressable, file-addressable, and/or content-addressable devices.

It will be appreciated that data storage devices 512 include one or more physical devices. However, aspects of the instructions described herein alternatively may be propagated by a communication medium (e.g., an electromagnetic signal, an optical signal, etc.) that is not held by a physical device for a finite duration.

Aspects of logic devices 510 and storage devices 512 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via one or more of the logic devices 510 executing instructions held by one or more of the storage devices 512. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service" may be used to refer to an application program or set of programs executable across multiple user sessions. A service may be available to one or more system components, programs, and/or other services. In some implementations, a service may run on one or more server-computing devices.

Input/output devices 518 may comprise or interface with one or more input devices such as a keyboard, mouse, touch screen, game controller, sensor, etc. In some embodiments, input devices may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. Examples of output devices include graphical displays, audio speakers, haptic feedback devices, etc.

Communication devices 520 may include the various wired and/or wireless communication interfaces disclosed herein, and may be configured to communicatively couple computing system 500 with one or more other computing devices. Communication devices 520 may include wired and/or wireless communication devices compatible with one or more different communication protocols. As examples, such communication devices may be configured for communication via a wireless telephone network, or a wired or wireless local- or wide-area network. The communication devices may allow computing system 500 to send and/or receive messages to and/or from other devices via a communication network such as the Internet.

Another example provides a method performed by a computing system, the method comprising obtaining an indication of physical contact of an interface of a hand-mounted mobile device with a physical object via a touch sensor of the mobile device; identifying a location of the interface of the mobile device during the physical contact with the physical object based on sensor data obtained from one or more positioning sensors; storing location data indicating the location in a data storage device; and prioritizing refinement of a virtual mesh model of a physical environment containing the physical object based on the location indicated by the location data. In this or any other example of the present disclosure, prioritizing refinement of the virtual mesh model based on the location includes processing image data obtained by optical imaging of the physical environment to extract a higher resolution of mesh nodes in a vicinity of the location indicated by the location data as compared to other regions of the physical environment located outside of the vicinity of the location. In this or any other example of the present disclosure, prioritizing refinement of the virtual mesh model based on the location includes processing image data obtained by optical imaging of the physical environment to extract mesh nodes in a vicinity of the location indicated by the location data prior to processing other image data obtained by the optical imaging of the physical environment to extract mesh nodes located outside of the vicinity of the location. In this or any other example of the present disclosure, prioritizing refinement of the virtual mesh model based on the location includes capturing image data in a vicinity of the location indicated by the location data prior to capturing other image data of other regions of the physical environment located outside of the vicinity of the location. In this or any other example of the present disclosure, storing the location data in the data storage device includes storing the location data as a data component of a selected mesh node of the virtual mesh model. In this or any other example of the present disclosure, the method further comprises associating an identifier with the virtual mesh model to designate the selected mesh node as being the location of the physical contact within the virtual mesh model. In this or any other example of the present disclosure, the mobile device comprises a glove. In this or any other example of the present disclosure, the interface and the touch sensor are disposed adjacent to an end of a finger compartment of the glove. In this or any other example of the present disclosure, the glove includes a plurality of finger compartments in which each finger compartment of the plurality of finger compartments includes a respective interface and a respective touch sensor disposed adjacent to an end of that finger compartment. In this or any other example of the present disclosure, the one or more positioning sensors include one or more of an inertial sensor, a magnetometer sensor, a GPS sensor, and/or a strain sensor located on-board the mobile device. In this or any other example of the present disclosure, the one or more positioning sensors include an optical sensor located off-board the mobile device that images an optical tracking feature of the mobile device. In this or any other example of the present disclosure, the method further comprises identifying an orientation of the interface of the mobile device during the physical contact with the physical object based on the sensor data obtained from the one or more positioning sensors; and storing orientation data indicating the orientation in the data storage device.

Another provides a computing system comprising one or more logic devices programmed with instructions executable by the one or more logic devices to obtain an indication of physical contact of an interface of a hand-mounted mobile device with a physical object via a touch sensor of the mobile device; identify a location of the interface of the mobile device during the physical contact with the physical object based on sensor data obtained from one or more positioning sensors; store location data indicating the location in a data storage device; and prioritize refinement of a virtual mesh model of a physical environment containing the physical object based on the location indicated by the location data. In this or any other example of the present disclosure, the computing system further comprises the mobile device. In this or any other example of the present disclosure, the mobile device comprises a glove. In this or any other example of the present disclosure, the interface and the touch sensor are disposed adjacent to an end of a finger compartment of the glove. In this or any other example of the present disclosure, at least one positioning sensor of the one or more positioning sensors is located on-board the glove. In this or any other example of the present disclosure, the at least one positioning sensor includes an inertial sensor, a magnetometer sensor, a GPS sensor, and/or a strain sensor. In this or any other example of the present disclosure, at least one positioning sensor of the one or more positioning sensors includes an optical sensor. In this or any other example of the present disclosure, the optical sensor is remotely located from the mobile device; and the one or more logic devices are further programmed with instructions executable by the one or more logic devices to image an optical tracking feature of the mobile via the optical sensor to identify the location of the interface of the mobile device during the physical contact with the physical object. In this or any other example of the present disclosure, the optical sensor is located on-board a head-mounted display device. In this or any other example of the present disclosure, the computing system further comprises the head-mounted display device; and the indication of the physical contact is received from the mobile device by the one or more logic devices over a wireless communications link established between the mobile device and the head-mounted display device. In this or any other example of the present disclosure, the one or more logic devices are further programmed with instructions executable by the one or more logic devices to identify an orientation of the interface of the mobile device during the physical contact with the physical object based on the sensor data obtained from the one or more positioning sensors; and store orientation data indicating the orientation in the data storage device.

Another example provides a mobile device comprising a wearable glove having at least one finger compartment; a touch sensor disposed adjacent to an end of the finger compartment to identify physical contact of the wearable glove; one or more positioning sensors to identify a positioning of the interface in multi-dimensional space; a wireless communication interface; and one or more logic devices programmed with instructions executable by the one or more logic devices to obtain an indication of a physical contact of the interface with a physical object via the touch sensor; upon obtaining the indication of the physical contact with the physical object, capture sensor data from the one or more positioning sensors indicating a positioning of the interface; and transmit the sensor data or an indication of the positioning of the interface via the wireless communication interface directed to a remote computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method performed by a computing system, the method comprising:
obtaining an indication of physical contact of an interface of a hand-mounted mobile device with a physical object via a touch sensor of the mobile device;
identifying a location of the interface of the mobile device during the physical contact with the physical object based on sensor data obtained from one or more positioning sensors;
storing location data indicating the location in a data storage device; and
prioritizing refinement of a virtual mesh model of a physical environment containing the physical object based on the location indicated by the location data.

2. The method of claim 1, wherein prioritizing refinement of the virtual mesh model based on the location includes:
processing image data obtained by optical imaging of the physical environment to extract a higher resolution of mesh nodes in a vicinity of the location indicated by the location data as compared to other regions of the physical environment located outside of the vicinity of the location.

3. The method of claim 1, wherein prioritizing refinement of the virtual mesh model based on the location includes:
processing image data obtained by optical imaging of the physical environment to extract mesh nodes in a vicinity of the location indicated by the location data prior to processing other image data obtained by the optical imaging of the physical environment to extract mesh nodes located outside of the vicinity of the location.

4. The method of claim 1, wherein prioritizing refinement of the virtual mesh model based on the location includes:
capturing image data in a vicinity of the location indicated by the location data prior to capturing other image data of other regions of the physical environment located outside of the vicinity of the location.

5. The method of claim 1, wherein storing the location data in the data storage device includes storing the location data as a data component of a selected mesh node of the virtual mesh model.

6. The method of claim 5, further comprising:
associating an identifier with the virtual mesh model to designate the selected mesh node as being the location of the physical contact within the virtual mesh model.

7. The method of claim 1, wherein the mobile device comprises a glove.

8. The method of claim 7, wherein the interface and the touch sensor are disposed adjacent to an end of a finger compartment of the glove.

9. The method of claim 8, wherein the glove includes a plurality of finger compartments in which each finger compartment of the plurality of finger compartments includes a respective interface and a respective touch sensor disposed adjacent to an end of that finger compartment.

10. The method of claim 1, wherein the one or more positioning sensors include one or more of an inertial sensor, a magnetometer sensor, a GPS sensor, and/or a strain sensor located on-board the mobile device.

11. The method of claim 1, wherein the one or more positioning sensors include an optical sensor located off-board the mobile device that images an optical tracking feature of the mobile device.

12. The method of claim 1, further comprising:
identifying an orientation of the interface of the mobile device during the physical contact with the physical object based on the sensor data obtained from the one or more positioning sensors; and
storing orientation data indicating the orientation in the data storage device.

13. A computing system, comprising:
one or more logic devices programmed with instructions executable by the one or more logic devices to:
obtain an indication of physical contact of an interface of a hand-mounted mobile device with a physical object via a touch sensor of the mobile device;
identify a location of the interface of the mobile device during the physical contact with the physical object based on sensor data obtained from one or more positioning sensors;
store location data indicating the location in a data storage device; and
prioritize refinement of a virtual mesh model of a physical environment containing the physical object based on the location indicated by the location data.

14. The computing system of claim 13, further comprising the mobile device;
wherein the mobile device comprises a glove; and
wherein the interface and the touch sensor are disposed adjacent to an end of a finger compartment of the glove.

15. The computing system of claim 14, wherein at least one positioning sensor of the one or more positioning sensors is located on-board the glove.

16. The computing system of claim 15, wherein the at least one positioning sensor includes an inertial sensor, a magnetometer sensor, a GPS sensor, and/or a strain sensor.

17. The computing system of claim 13, wherein at least one positioning sensor of the one or more positioning sensors includes an optical sensor;
wherein the optical sensor is remotely located from the mobile device; and
wherein the one or more logic devices are further programmed with instructions executable by the one or more logic devices to:
image an optical tracking feature of the mobile via the optical sensor to identify the location of the interface of the mobile device during the physical contact with the physical object.

18. The computing system of claim 17, wherein the optical sensor is located on-board a head-mounted display device;
wherein the computing system further comprises the head-mounted display device; and
wherein the indication of the physical contact is received from the mobile device by the one or more logic devices over a wireless communications link established between the mobile device and the head-mounted display device.

19. The computing system of claim 13, wherein the one or more logic devices are further programmed with instructions executable by the one or more logic devices to:
identify an orientation of the interface of the mobile device during the physical contact with the physical object based on the sensor data obtained from the one or more positioning sensors; and store orientation data indicating the orientation in the data storage device.

20. A mobile device, comprising:

a wearable glove having at least one finger compartment;

a touch sensor disposed adjacent to an end of the finger compartment to identify physical contact of the wearable glove;

one or more positioning sensors to identify a positioning of the interface in multi-dimensional space;

a wireless communication interface; and one or more logic devices programmed with instructions executable by the one or more logic devices to:

obtain an indication of a physical contact of the interface with a physical object via the touch sensor;

upon obtaining the indication of the physical contact with the physical object, capture sensor data from the one or more positioning sensors indicating a positioning of the interface; and transmit the sensor data or an indication of the positioning of the interface via the wireless communication interface directed to a remote computing device for prioritizing refinement of a virtual mesh model of a physical environment containing the physical object based on the sensor data or the indication of the positioning of the interface.

* * * * *